(12) United States Patent
Wienkes et al.

(10) Patent No.: US 11,709,124 B2
(45) Date of Patent: Jul. 25, 2023

(54) PARTICLE SENSOR SAMPLE AREA QUALIFICATION WITHOUT A PHYSICAL SLIT

(71) Applicant: Honeywell International Inc., Morris Plains, NJ (US)

(72) Inventors: Lee R. Wienkes, Minneapolis, MN (US); Xiao Zhu Fan, Plymouth, MN (US)

(73) Assignee: Honeywell International Inc., Charlotte, NC (US)

( * ) Notice: Subject to any disclaimer, the term of this patent is extended or adjusted under 35 U.S.C. 154(b) by 113 days.

(21) Appl. No.: 16/927,737

(22) Filed: Jul. 13, 2020

(65) Prior Publication Data
US 2022/0011215 A1 Jan. 13, 2022

(51) Int. Cl.
*G01N 15/14* (2006.01)
(52) U.S. Cl.
CPC ..... *G01N 15/1429* (2013.01); *G01N 15/1434* (2013.01)
(58) Field of Classification Search
None
See application file for complete search history.

(56) References Cited

U.S. PATENT DOCUMENTS

| 9,110,019 B2 | 8/2015 | Mitsuyama et al. | |
|---|---|---|---|
| 2005/0099626 A1* | 5/2005 | King | G01N 15/0227 356/335 |
| 2007/0064990 A1* | 3/2007 | Roth | G01N 15/1463 382/128 |

(Continued)

FOREIGN PATENT DOCUMENTS

| EP | 2302363 A2 | 3/2011 |
|---|---|---|
| EP | 3611462 A1 | 2/2020 |

OTHER PUBLICATIONS

Fletcher et al., "Certification of New Standard Reference Material 2806b Medium Test Dust in Hydraulic Fluid", Journal of Research of the National Institute of Standards and Technology, Dec. 19, 2016, pp. 476 through 497, vol. 121, National Institute of Standards and Technology.

(Continued)

*Primary Examiner* — Rufus L Phillips
(74) *Attorney, Agent, or Firm* — Fogg & Powers LLC

(57) ABSTRACT

A system comprises a particle sensor unit in communication with a processor. The sensor unit comprises a source that transmits light into an interrogation region; receive optics that collect scattered light from particles in the interrogation region; and an optical detector that receives the collected light from the receive optics. The detector comprises a sample area including one or more sampling pixels, and an edge region including one or more edge pixels. The processor analyzes intensity data from the detector by a method comprising: combining all intensity data from the sampling pixels; adding the combined intensity data to a data set; determining whether to accept overlap intensity data that corresponds to an overlap between the sampling pixels and the edge pixels; adding the overlap intensity data to the data set if accepted; discarding the overlap intensity data if not accepted; and discarding all non-overlapping intensity data from the edge pixels.

7 Claims, 7 Drawing Sheets

(56) References Cited

U.S. PATENT DOCUMENTS

| | | | |
|---|---|---|---|
| 2007/0146703 A1* | 6/2007 | Adams | G01N 15/147 |
| | | | 356/337 |
| 2007/0165225 A1* | 7/2007 | Trainer | G01N 15/1459 |
| | | | 356/335 |
| 2007/0242269 A1* | 10/2007 | Trainer | G01N 15/0205 |
| | | | 356/336 |
| 2016/0202164 A1 | 7/2016 | Trainer | |
| 2018/0088045 A1* | 3/2018 | Garde | G01S 17/86 |
| 2018/0366570 A1 | 12/2018 | Knox et al. | |

OTHER PUBLICATIONS

Laserfocusworld, "CMOS Detectors: Concentric photodiode array enables spatial-domain multiplexing", Apr. 1, 2009, pp. 1 through 11.

* cited by examiner

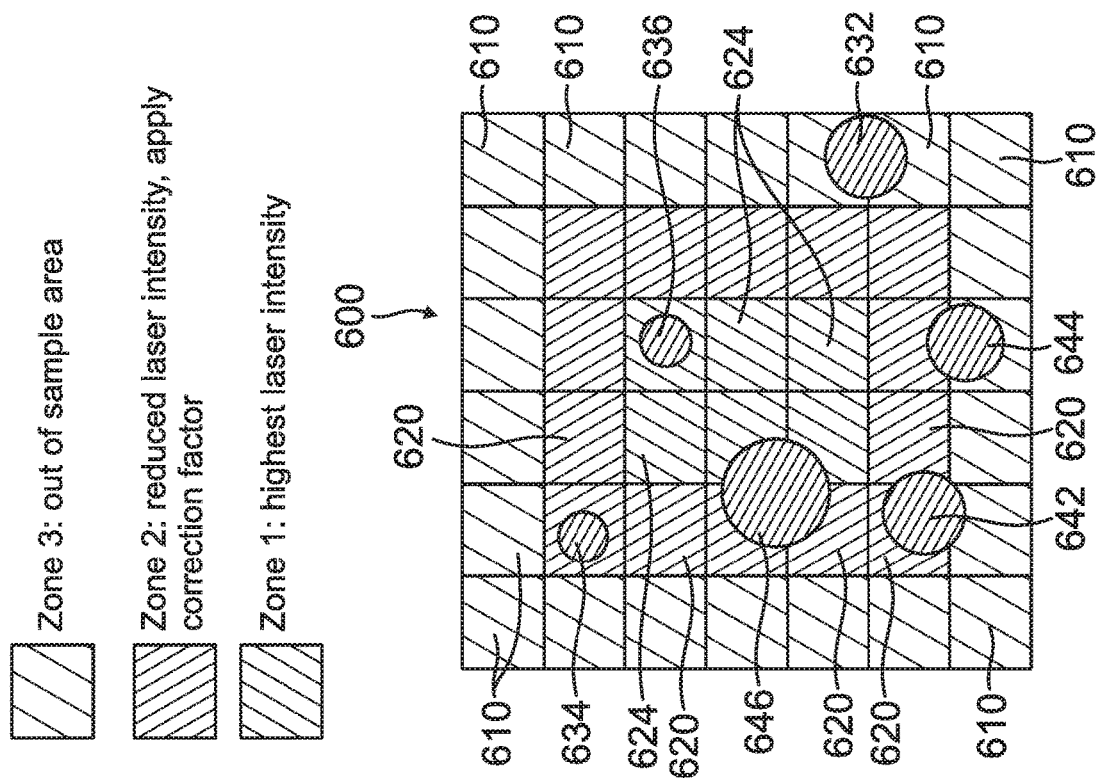
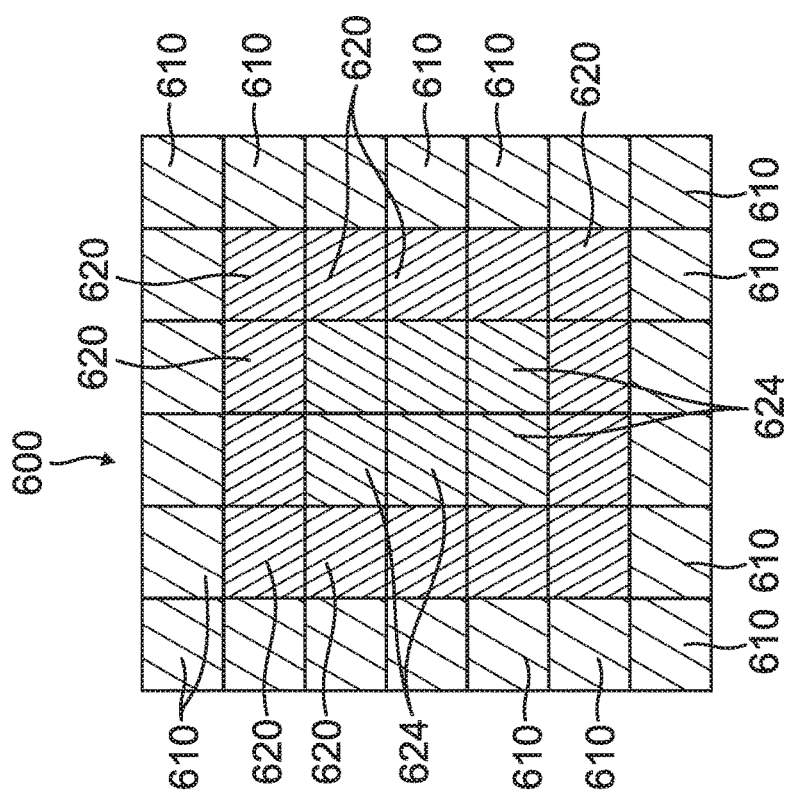
FIG. 6B
FIG. 6A

PARTICLE SENSOR SAMPLE AREA QUALIFICATION WITHOUT A PHYSICAL SLIT

BACKGROUND

Optically detecting particulates in fluids typically utilizes a light source to illuminate a particle (or many particles) and a train of collection optics to receive the scattered light from of the particles along with a detector to convert the collected light into an electrical signal that can be processed, digitized, etc. However, in order to obtain an accurate measurement of both individual particle size and in turn aggregate properties, such as total mass content or median volume diameter, the particle size must be consistently measured across the sample area.

There are two standard methods of defining the sample area which restrict the measured sample area to the region of highest uniformity. A first method employs one detector with one physical slit to restrict light from areas outside the sample region. This method has the disadvantage that when particles are at the edge of the sample region, part of the light is blocked and the particle is undersized, but that is unknown to a user. A second method employs two detectors, with one detector having a physical slit and the other detector does not. This solves the problem of the single detector/single slit configuration above, but forces the user to split the optical signal and also creates a larger optical layout by adding in a beam splitter.

SUMMARY

A system comprises a particle sensor unit, and a processor unit in operative communication with the particle sensor unit. The particle sensor unit comprises: at least one light source configured to transmit a light beam into an interrogation region; a set of receive optics configured to collect a scattered portion of the transmitted light beam from one or more particles in the interrogation region; and an optical detector configured to receive the collected scattered portion from the receive optics. The optical detector comprises at least a first sample area that includes one or more sampling pixels, and an edge region that includes one or more edge pixels. The optical detector is operative to measure an intensity from the collected scattered portion that corresponds to the one or more particles.

The processor unit is operative to execute instructions to perform a method for analyzing intensity data received from the particle sensor unit. The method comprises: combining all intensity data from the one or more sampling pixels; adding the combined intensity data from the one or more sampling pixels to at least a first data set; determining whether to accept overlap intensity data that corresponds to an overlap between one or more of the sampling pixels and one or more of the edge pixels; adding the overlap intensity data to the first data set if accepted; discarding the overlap intensity data if not accepted; and discarding all non-overlapping intensity data from the one or more edge pixels.

DRAWINGS

Understanding that the drawings depict only exemplary embodiments and are not therefore to be considered limiting in scope, the exemplary embodiments will be described with additional specificity and detail through the use of the accompanying drawings, in which.

Figure 4B:
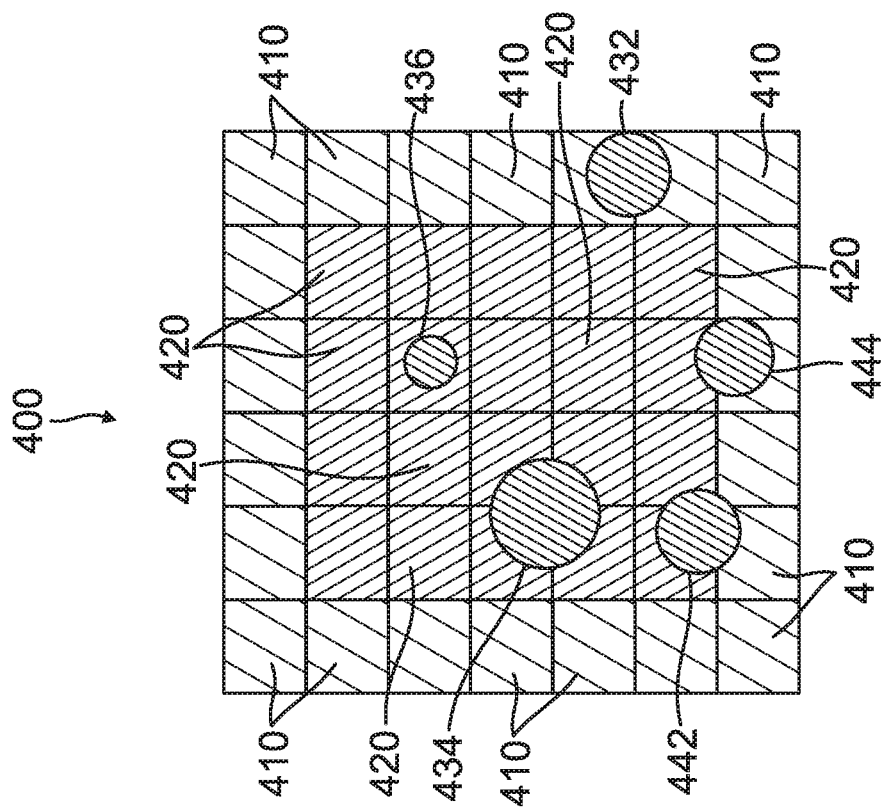
Figure 4A:
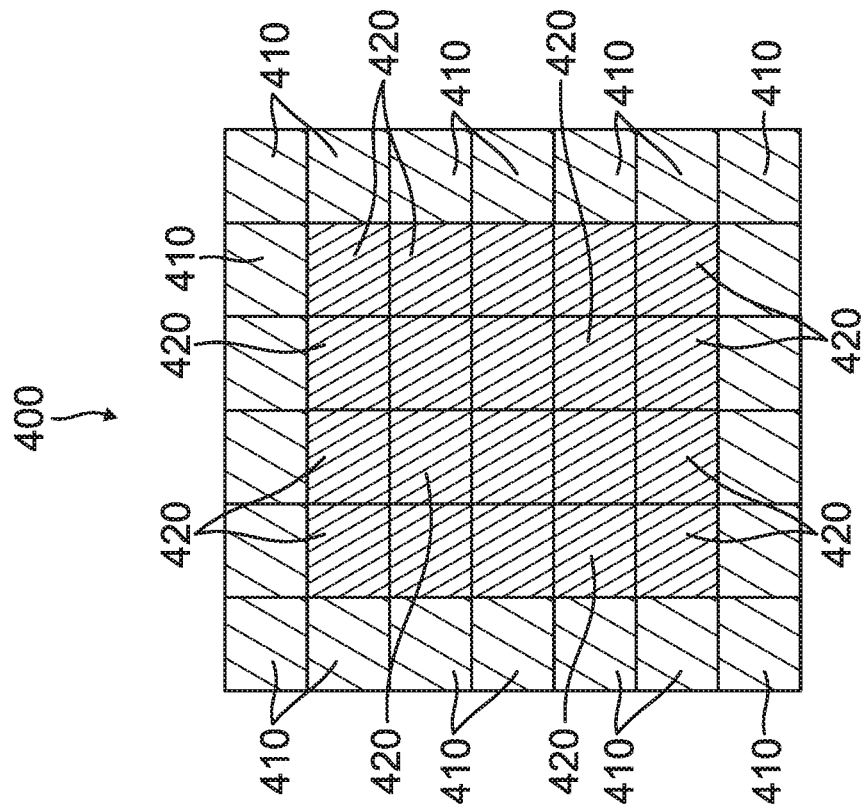
Figure 5B:
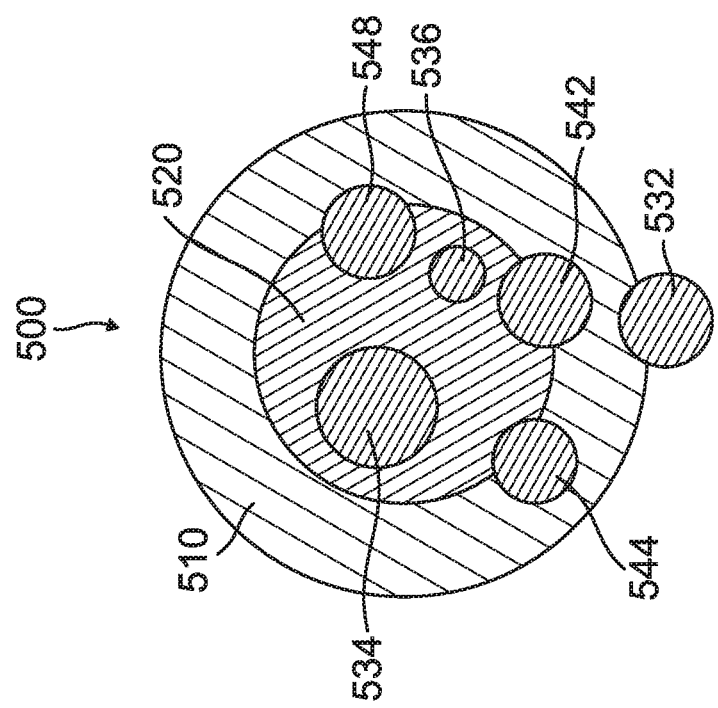
Figure 5A:
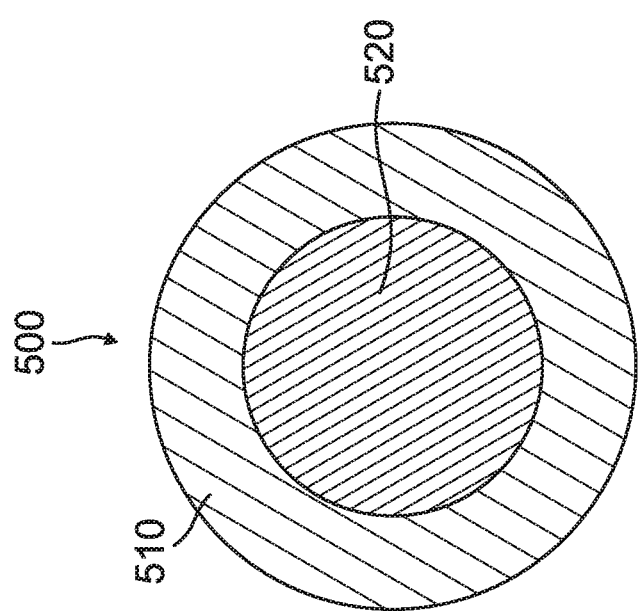
Figure 7:
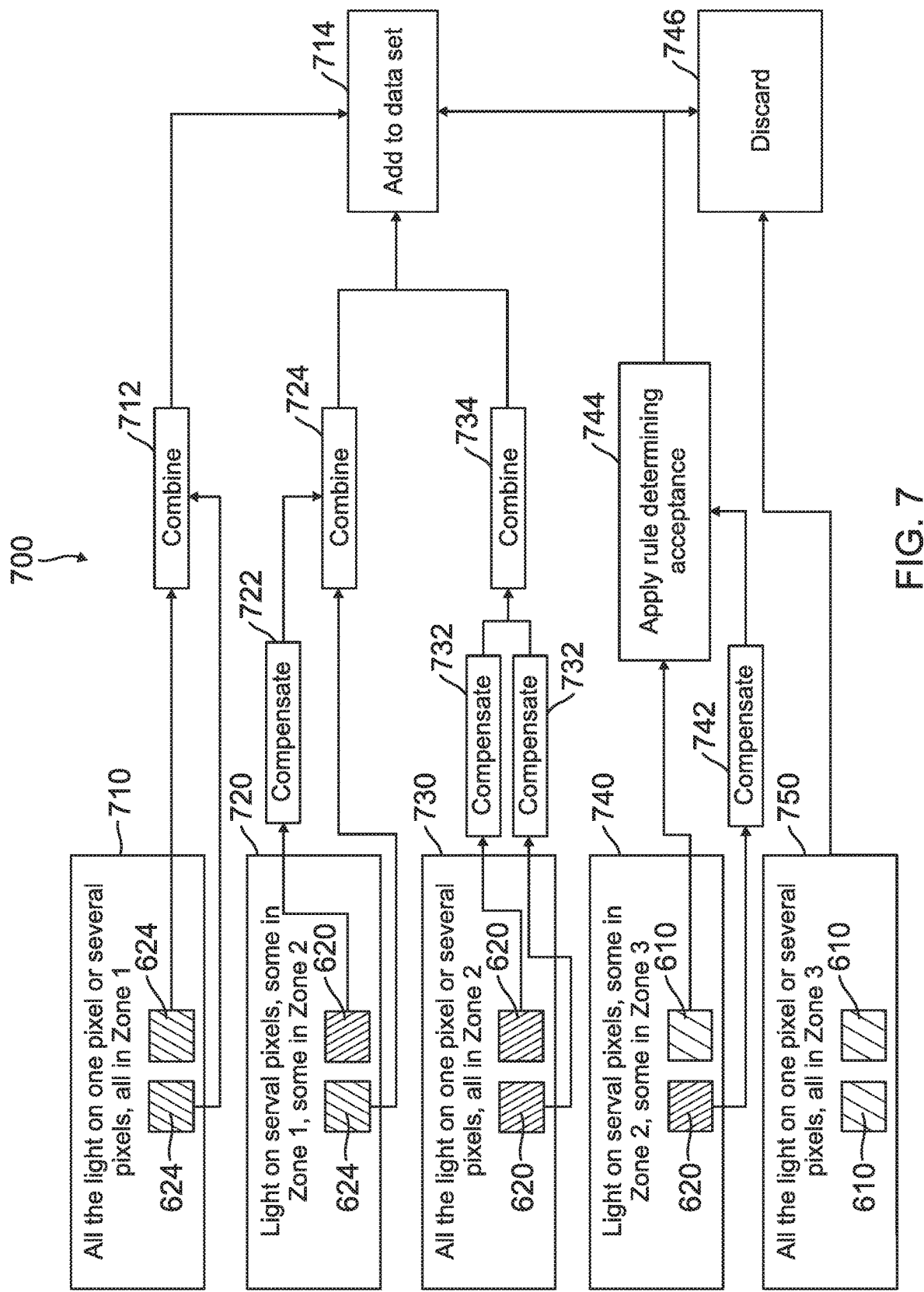

FIGS. 4A and 4B schematically illustrate one example of an optical detector, which can be implemented in a particle sensor unit;

FIGS. 5A and 5B schematically illustrate another example of an optical detector, which can be implemented in a particle sensor unit;

FIGS. 6A and 6B schematically illustrate a further example of an optical detector, which can be implemented in a particle sensor unit; and FIG. 7 is a flow diagram of an exemplary method for data processing, which can be implemented for analyzing light data received by the optical detector of FIGS. 6A and 6B.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method that provide a particle sensor sample area qualification without a physical slit are described herein.

The present approach employs a single detector that is segmented into separate detection pixels. Examples of such a detector are a charge-coupled device (CCD) or arrays of photodiodes, but other types of detectors can be used. The present method uses knowledge of which pixel on the detector detected a particle to know if the particle is in the optimum sample area. With this approach, the full benefits of a two detector/one slit configuration can be received, but in a more compact layout without loss of signal.

In one implementation, an optical system for particle detection is employed that includes an illumination light source, such as a laser device (diode), a set of receive optics, such as a collection lens assembly, and an optical detector with at least two detection pixels. In one embodiment, the receive optics are colinear with the laser device, to collect either forward or back scattered light. In another embodiment, the receive optics are at an angle with respect to the laser device, to collect scattered light with a set of angles not centered around 180°. In either embodiment, the receive optics can have a defined focus, which is aligned with the most uniform area of the illumination light source. In addition, a detector array with multiple pixels can be positioned at the opposite focus of the receive optics.

The present system provides a unique optical layout and signal processing rules for implementation, and a unique application of the detector array for the measurement of particulate backscatter signals. The present system provides the benefits of a more compact optical layout compared to the state of the art, and a higher optical efficiency (throughput).

With enough pixel resolution, the present approach can be utilized to correct for sample area illumination non-uniformity, such as by applying a software correction. This can expand the usable sample area of illumination, making more efficient use of the illumination light.

The present system and method also improve particle measurement accuracy, and improve confidence level (for certification purposes). With enough pixel resolution, an in-situ focus test can be employed, which detects how many pixels a single particle is across. In addition, with enough pixel resolution, a higher maximum particle detection rate can be achieved by allowing for coincident particles.

The present approach also provides the advantages of increased accuracy for a particulate detection system, while allowing for a smaller form factor. For example, the present approach can be employed to improve the sizing of a particle analyzer, which generates particle data.

In addition, the present particle sensor system and method can be implemented for use in various platforms, such as various types of vehicles, including aircraft, ground vehicles, marine craft, spacecraft, or the like. In one embodiment, a particle sensor device employing the present techniques can be implemented to transmit particulate data onto an aircraft data bus.

Further details of various embodiments are described hereafter with reference to the drawings.

Figure 1:
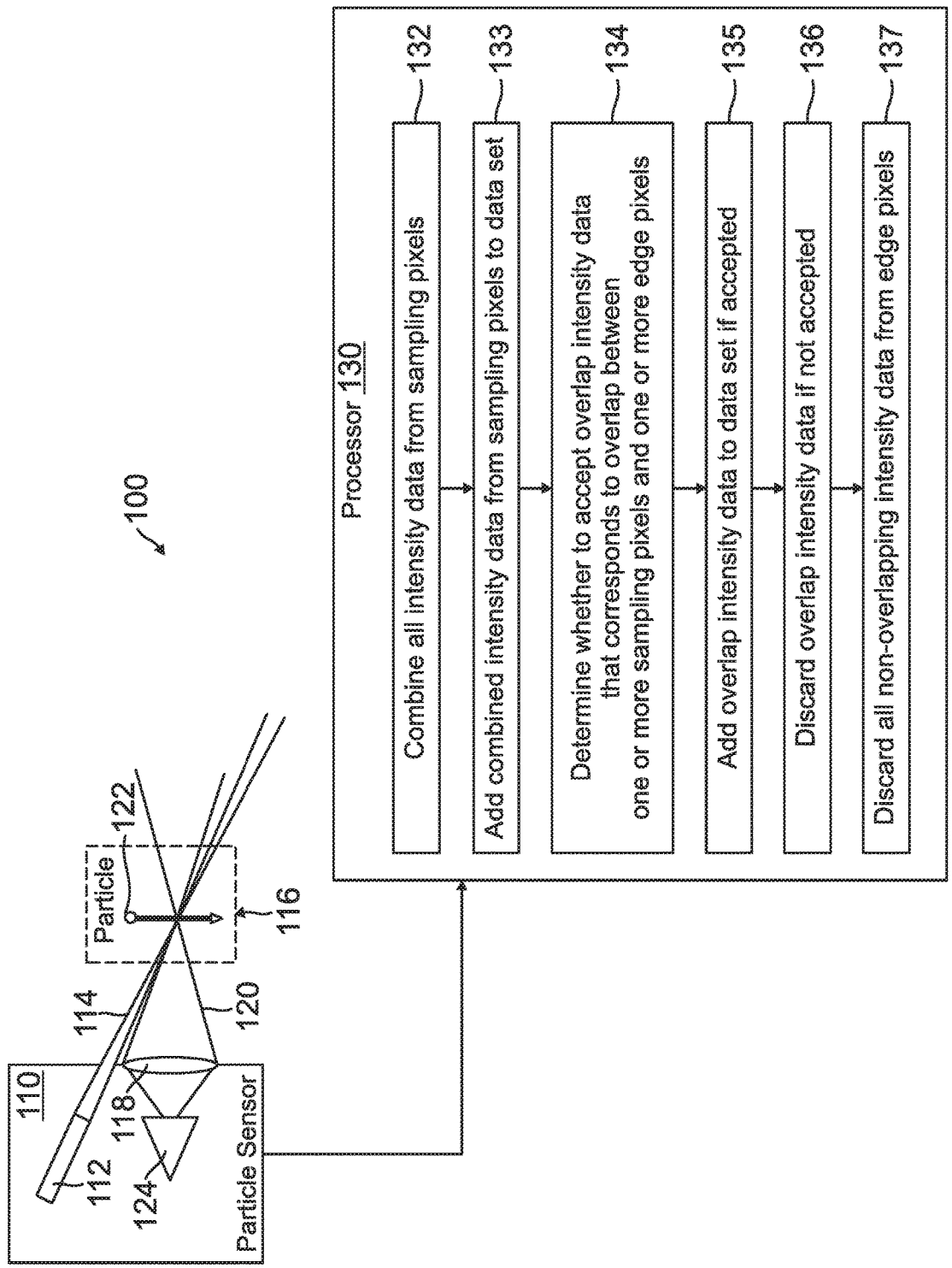
FIG. 1 is a block diagram of a system for sensing particles, according to one embodiment.

FIG. 1 illustrates a system 100 for sensing particles, according to one embodiment. The system 100 generally comprises a particle sensor unit 110, without a physical slit, and a processor unit 130 in operative communication with particle sensor unit 110. The processor unit 130 is operative to execute instructions stored on a processor readable medium to perform a method for analyzing intensity data received from particle sensor unit 110.

The particle sensor unit 110 comprises at least one light source 112, such as a laser device, which is configured to transmit a light beam 114 into an interrogation region 116. A set of receive optics 118 in particle sensor unit 110 is configured to collect a scattered portion 120 of transmitted light beam 114 from at least one particle 122 in interrogation region 116. In one embodiment, light source 112 and receive optics 118 can be implemented in an optical transceiver.

An optical detector 124 in particle sensor unit 110 is configured to receive the collected scattered portion 120 from receive optics 118. The optical detector 124 comprises at least a first sample area that includes one or more sampling pixels, and an edge region that includes one or more edge pixels. The optical detector 124 is operative to measure a signal intensity from the collected scattered portion 120 that corresponds to one or more particles in interrogation region 116.

The processor unit 130 is configured to receive input data from optical detector 124 of particle sensor unit 110. The processor unit 130 is operative to combine all intensity data from the sampling pixels (block 132); add the combined intensity data from the sampling pixels to a data set (block 133); determine whether to accept overlap intensity data that corresponds to an overlap between one or more of the sampling pixels and one or more of the edge pixels (block 134); add the overlap intensity data to the data set if accepted (block 135); discard the overlap intensity data if not accepted (block 136); and discard all non-overlapping intensity data from the edge pixels (block 137).

The intensity data from the data set can then be analyzed by processor unit 130 to determine particle distributions in interrogation region 116, and to perform particle differentiation to determine types of particles in the particle distributions.

Figure 2:
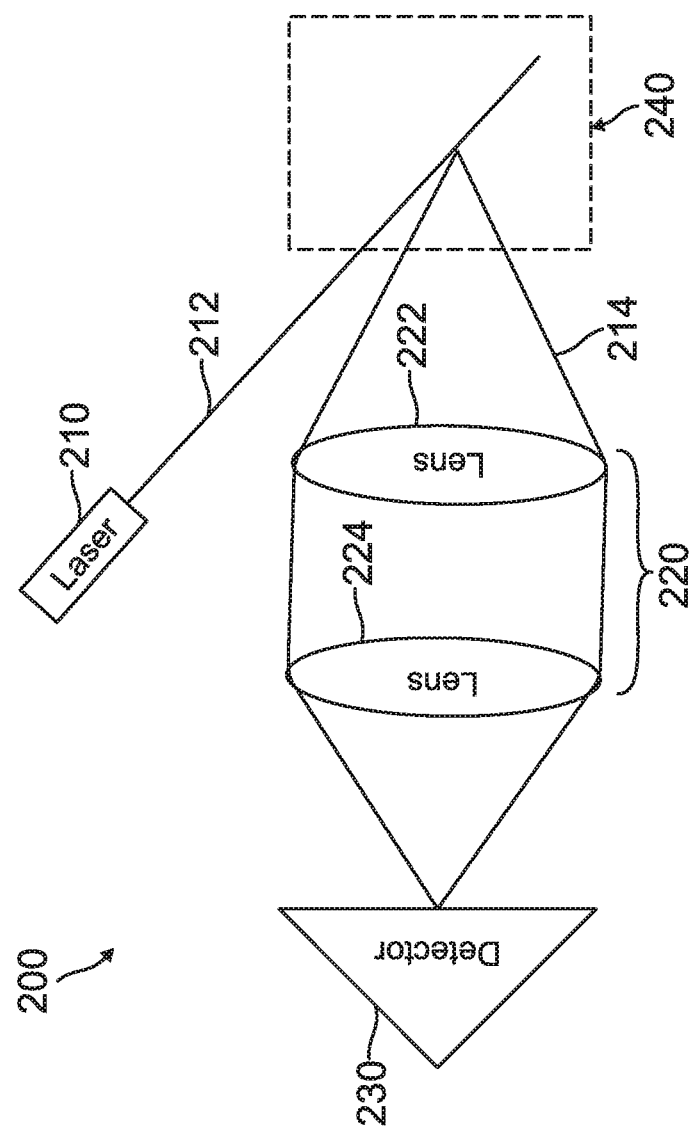
FIG. 2 is a schematic diagram of an exemplary optical layout for a particle sensor unit, according to one embodiment.

FIG. 2 is a block diagram of an exemplary optical layout 200 for a particle sensor unit, such as particle sensor unit 110, according to one embodiment. The optical layout 200 includes a laser device 210, a light collection assembly 220 with a first lens or set of lenses 222 and a second lens or set of lens 224, such as an finite conjugate lens arrangement, and an optical detector 230. The laser device 210 has an angled configuration with respect to light collection assembly 220, such that scattered light within a given set of angles can be collected by light collection assembly 220.

During operation, laser device 210 emits a light beam 212 that is transmitted into an interrogation air region 240. The light collection assembly 220 collects scattered light 214 of the transmitted light beam from interrogation air region 240. The collected scattered light is collimated by the lens or set of lenses 222, and the collimated light is then focused onto optical detector 230 using the second lens or set of lenses 224. The optical detector 230 is operative to measure an intensity from the collected scattered light that corresponds to one or more particles in interrogation air region 240. The intensity data is then sent from optical detector 230 to a processor unit, such as described above, to perform an analysis of the intensity data.

Figure 3:
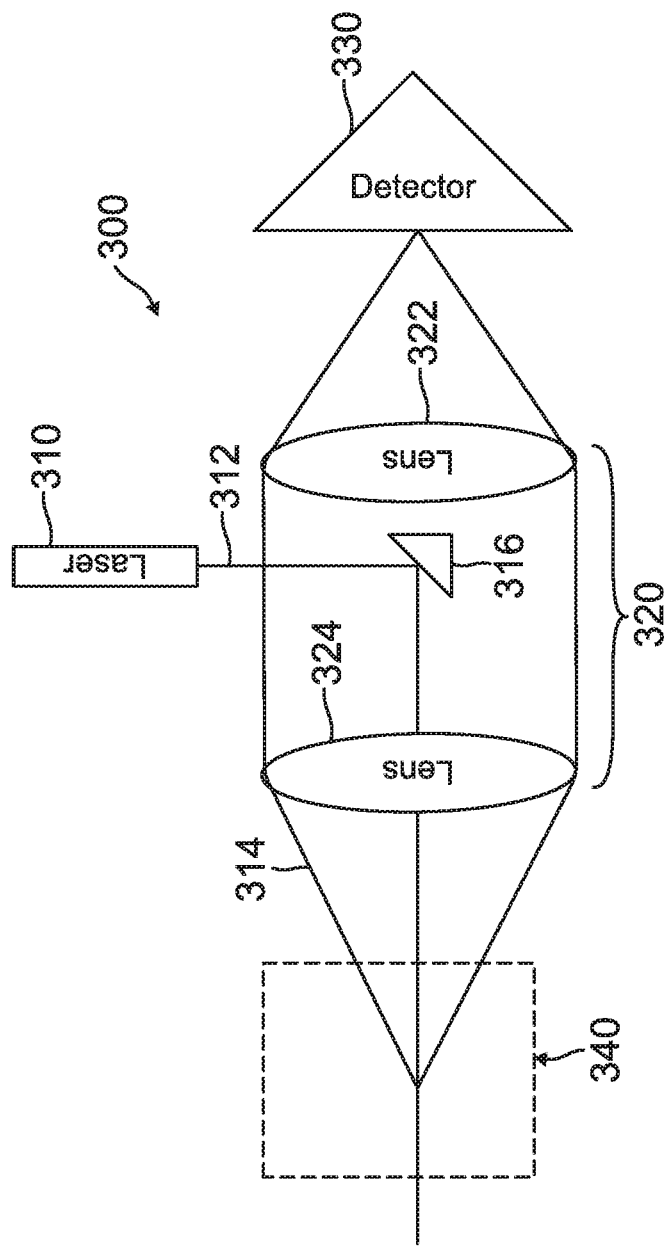
FIG. 3 is a schematic diagram of an exemplary optical layout for a particle sensor unit, according to another embodiment.

FIG. 3 is a block diagram of an exemplary optical layout 300 for a particle sensor unit, according to an alternative embodiment. The optical layout 300 includes a laser device 310, a light collection assembly 320 with one or more first lenses 322 and one or more second lenses 324, and an optical detector 330. A reflector 316, such as a mirror, is located between lenses 322 and 324. The laser device 310 has a colinear configuration such that direct back scattered light can be collected by light collection assembly 320.

During operation, laser device 310 emits a light beam 312 that is transmitted to reflector 316, which directs light beam 312 through lens/lenses 324 and into an interrogation air region 340. The light collection assembly 320 collects scattered light 314 of the transmitted light beam from interrogation air region 340. The collected scattered light is collimated by lens/lenses 324, and the collimated light is then focused onto optical detector 330 using lens/lenses 322. The optical detector 330 is operative to measure an intensity from the collected scattered light that corresponds to one or more particles in interrogation air region 340. The intensity data is then sent from optical detector 330 to a processor unit to perform an analysis of the intensity data.

FIGS. 4A and 4B illustrate one example of an optical detector 400, which can be implemented as the optical detector in the above described particle sensor units. The optical detector 400 is a multi-pixel detector, which has a rectangular array of pixels with an x-y grid pattern. An edge region of optical detector 400 comprises a set of edge pixels 410 located around a perimeter of optical detector 400. The edge pixels 410 are arranged in outermost rows/columns of pixels. A set of sampling pixels 420 are located on optical detector 400 such that edge pixels 410 surround sampling pixels 420. The sampling pixels 420 form a sample area used for detecting particles.

FIG. 4B shows various scenarios indicating how a particle signal landing in a particular location on optical detector 400 can be interpreted. In optical detector 400, edge pixels 410 are deemed "out of the sample area" such that particles that generate a substantial signal in edge pixels 410 are disqualified from analysis. For example, a particle signal 432, which is located on the right hand column of edge pixels 410, would be disqualified from analysis. Particles that generate substantial signals on sampling pixels 420 are deemed "in the sample area" and such signals are kept for analysis. For example, particle signals 434 and 436, which are located entirely on sample pixels 420 in the sample area, would be kept for analysis.

When particles generate signals that overlap both of edge pixels 410 and sampling pixels 420, then decision logic can be employed to decide whether the signals should be kept for analysis or disqualified. For example, particle signals 442 and 444 overlap portions of edge pixels 410 and sampling pixels 420. The decision logic is employed to decide whether particle signals 442 and 444 should be kept for analysis or disqualified. There are several potential metrics or logical operations which could be used to determine whether to keep or reject particles in the overlap portions. One specific example of this decision logic can be a simple majority rule, where if the particle signal is mostly in the sampling pixels, it will be kept and if the particle signal is mostly in the edge pixels, it will be discarded. In this case, as particle signal 442 is mostly in the sample area, particle signal 442 is kept for analysis. As particle signal 444 is mostly out of the sample area, particle signal 444 is disqualified. Other decision logic, such as logic which takes into account the expected physical extent of the particle light impinging on the detector compared to the pixel size to estimate if all the light was collected, can be implemented, depending on the number of pixels and computational power available.

As no light is detected in pixels 410, it can be assumed that all the light was collected and that a particle can be accurately sized. Depending on the user's final specifications, more than one row/column of pixels could be used to reject particle signals.

FIGS. 5A and 5B illustrate another example of an optical detector 500, which can be implemented as the optical detector in the above described particle sensor units. The optical detector 500 is a multi-pixel detector, but with a concentric ring of pixels, and is implemented in a simplified "two-pixel" embodiment. As such, a circular edge pixel 510 is located around a perimeter of optical detector 500, and a circular sampling pixel 520 is located on optical detector 500 such that edge pixel 510 surrounds sampling pixel 520. The optical detector 500 can be implemented with a custom photodiode, for example. The main advantage of the configuration of optical detector 500 is that the signal-to-noise and readout rate are improved due to the consolidation of pixels.

In an alternative embodiment, optical detector 500 can be formed with concentric square-shaped pixels or other arbitrary shapes with at least one sampling region enclosed by an edge region.

FIG. 5B shows various scenarios indicating how a particle signal landing in a particular location on optical detector 500 can be interpreted. In optical detector 500, edge pixel 510 is deemed out of the sample area, such that particles that generate a substantial signal in edge pixel 510 are disqualified from analysis. For example, a particle signal 532, which is located on a portion of edge pixel 510 with no signal in the sampling region, would be disqualified from analysis. Particles that generate substantial signals on sample pixel 520 are deemed in the sample area, and such signals are kept for analysis. For example, particle signals 534 and 536, which are located entirely on sample pixel 520, would be kept for analysis.

When particles generate signals that overlap both of edge pixel 510 and sampling pixel 520, then decision logic can be employed to decide whether the signals should be kept for analysis or disqualified. For example, particle signals 542, 544, and 548 overlap with portions of edge pixel 510 and sampling pixel 520. The decision logic is employed to decide whether particle signals 542, 544, and 548 should be kept for analysis or disqualified. Using the sample logic presented with FIG. 4B, as more of particle signal 548 is on sampling pixel 520 than edge pixel 510, particle signal 548 is kept for analysis. However, as more of particle signals 542 and 544 are on edge pixel 510 than sampling pixel 520, particle signals 542 and 544 are disqualified.

FIGS. 6A and 6B illustrate a further example of an optical detector 600, which can be implemented as the optical detector in the above described particle sensor units. The optical detector 600 is a multi-pixel detector, which has a rectangular array of pixels with an x-y grid pattern. In optical detector 600, a denser x-y grid of pixels is used compared to that of optical detector 400 (FIG. 4A).

As shown in FIG. 6A, an edge region of optical detector 600 comprises a set of edge pixels 610 located around a perimeter of optical detector 600. A first set of sampling pixels 620 are located on optical detector 600 such that edge pixels 610 surround sampling pixels 620. A second set of sampling pixels 624 are located in a central portion of optical detector 600 such that sampling pixels 620 surround sampling pixels 624.

The configuration of optical detector 600 allows for applying a correction for sample illumination. This assumes the central sample pixels 624 have the highest illumination as is typical for a Gaussian beam profile, which is a common profile used for particle sensing applications. With more pixels, more layers of correction can be added, but at the expense of reduced signal-to-noise. For example, as shown in FIG. 6B, sampling pixels 624 are located in first zone (Zone 1), which has the highest laser illumination intensity. The sampling pixels 620 are located in second zone (Zone 2), which has a reduced laser illumination intensity, and a correction factor can be applied in order to compensate for this known reduced illumination intensity. At the limit of technique, all pixels can be assigned their own correction factor, which can be determined either through testing or modeling of the sensor. The correction factors can be recalibrated over time if there is drift or degradation in hardware.

The array of pixels within each zone can be used to compare and validate the measurements against one another. Depending on the zone, the compensation factor can be applied to ensure uniform particle measurement across the entire sampling area. Particle measurements can be discarded completely if the measurement fails validation or falls out of the interrogation volume. The array of pixels can also be used to detect fault/error in the system. For example, one pixel could have an unexpected intensity compared to its neighboring pixel; or a group of pixels might always have a high baseline signal relative to the entire array.

FIG. 6B shows various scenarios indicating how a particle signal landing in a particular location on optical detector 600 can be interpreted. In optical detector 600, edge pixels 610 are deemed out of the sample area, such that particles that generate a substantial signal in edge pixels 610 are disqualified from analysis. For example, a particle signal 632, which is located on the right hand column of edge pixels 610, would be disqualified from analysis. Particles that generate substantial signals on sample pixels 620 are deemed to be in the Zone 2 sample area, and such signals are kept for analysis. For example, particle signal 634, which is located entirely on a sample pixel 620 in Zone 2, would be kept for analysis, with a correction factor being applied. Particles that generate substantial signals on sampling pixels 624 are deemed to be in the Zone 1 sample area, and such signals are kept for analysis. For example, particle signal 636, which is located entirely on a sample pixel 624 in Zone 1, would be kept for analysis.

When particles generate signals that overlap both of edge pixels 610 and sample pixels 620, then decision logic can be employed to decide whether the signals should be kept for analysis or disqualified. For example, particle signals 642 and 644 overlap portions of edge pixels 610 and sampling pixels 620. The decision logic is employed to decide whether particle signals 642 and 644 should be kept for analysis or disqualified. Using the sample logic presented with FIG. 4B, as particle signal 642 is mostly in the sample area of Zone 2, particle signal 642 is kept for analysis. As particle signal 644 is mostly out of the sample area of Zone 2, particle signal 644 is disqualified.

When particles generate signals that overlap both sampling pixels 620 in Zone 2 and sampling pixels 624 in Zone 1, then a correction factor can be applied to the signals from pixels 620 in Zone 2. For example, particle signal 646 overlaps portions of sampling pixels 620 and sampling pixels 624, such that particle signal 646 is partially in each of Zone 1 and Zone 2. A correction factor is applied only to the signal that overlaps with pixels 620 in Zone 2.

FIG. 7 is a flow diagram of an exemplary method 700 for data processing, which can be implemented by a processor for analyzing intensity (light) data received from the optical detector, such as optical detector 600 (FIG. 6A). The method 700 analyzes all the light data (intensity data) from one or more sampling pixels (e.g., sampling pixels 624), which are all in Zone 1 (block 710), and combines this light data (block 712). The combined light data from the sampling pixels in Zone 1 is then added to a data set (block 714).

The method 700 can also analyze the overlapping light data from several pixels, with some of these pixels being in Zone 1 (e.g., sampling pixels 624) and some in Zone 2 (e.g., sampling pixels 620) (block 720). The light data from the pixels in Zone 2 is sent to a compensate module 722, which applies a correction factor to the signals from pixels in Zone 2. These corrected signals are combined with the signals from pixels in Zone 1 (block 724), and this combined light data is then added to the data set (block 714).

The method 700 can also analyze all the light data from one or more pixels, which are all in Zone 2 (e.g., sampling pixels 620) (block 730). The light data from each pixel in Zone 2 is sent to a compensate module 732, which applies a correction factor to each signal from each pixel in Zone 2. The corrected signals from each pixel in Zone 2 are combined (block 734), and this combined light data is then added to the data set (block 714).

The method 700 can also analyze overlapping light data from several pixels, with some of these pixels being in Zone 2 (e.g., sampling pixels 620) and some in Zone 3 (e.g., sampling pixels 610) (block 740). The light data from the pixels in Zone 2 is sent to a compensate module 742, which applies a correction factor to the signals from pixels in Zone 2. The light data from the pixels in Zone 3 is sent to a decision module 744, which applies one or more rules for determining acceptance of the light data from the pixels in Zone 3. The corrected signals from the pixels in Zone 2 are also sent to decision module 744. If the overlapping light data from the pixels in Zones 2 and 3 is accepted, then the light data is added to the data set (block 714). If the overlapping light data from the pixels in Zones 2 and 3 is not accepted, then this light data is discarded (block 746).

The method 700 can also analyze light data from one or several pixels, which are all in Zone 3 (e.g., sampling pixels 610) (block 750). The light data from the pixels in Zone 3 is all discarded (block 746). Furthermore, although not depicted, it should be clear that this method can also handle situations where light is collected by pixels in all three zones. In this case, no correction is applied to Zone 1 pixels, a correction is applied to Zone 2 pixels, which is then combined with the information from Zone 3 pixels to make a decision about particle acceptance. As a further variation of this method, Zone 3 can also have a correction factor, which is applied prior to the decision module.

Example Embodiments

Example 1 includes a system, comprising: a particle sensor unit, comprising: at least one light source configured to transmit a light beam into an interrogation region; a set of receive optics configured to collect a scattered portion of the transmitted light beam from one or more particles in the interrogation region; and an optical detector configured to receive the collected scattered portion from the receive optics, the optical detector comprising at least a first sample area that includes one or more sampling pixels, and an edge region that includes one or more edge pixels, wherein the optical detector is operative to measure an intensity from the collected scattered portion that corresponds to the one or more particles; a processor unit in operative communication with the particle sensor unit, the processor unit operative to execute instructions to perform a method for analyzing intensity data received from the particle sensor unit, the method comprising: combining all intensity data from the one or more sampling pixels; adding the combined intensity data from the one or more sampling pixels to at least a first data set; determining whether to accept overlap intensity data that corresponds to an overlap between one or more of the sampling pixels and one or more of the edge pixels; adding the overlap intensity data to the first data set if accepted; discarding the overlap intensity data if not accepted; and discarding all non-overlapping intensity data from the one or more edge pixels.

Example 2 includes the system of Example 1, wherein the at least one light source comprises a laser device.

Example 3 includes the system of Example 2, wherein the laser device has an angled configuration with respect to the light collection assembly, such that scattered light from the scattered portion of the transmitted light beam is collected by the light collection assembly.

Example 4 includes the system of Example 2, wherein the laser device has a colinear configuration with respect to the light collection assembly, such that scattered light from the scattered portion of the transmitted light beam is collected by the light collection assembly.

Example 5 includes the system of any of Examples 1-4, wherein: the optical detector includes a rectangular array of pixels with an x-y grid pattern; the edge region of the optical detector includes a plurality of edge pixels located around a perimeter of the optical detector; and the first sample area includes a plurality of sampling pixels located on the optical detector such that the edge pixels surround the sampling pixels.

Example 6 includes the system of any of Examples 1-4, wherein: the optical detector includes a concentric ring of pixels; the edge region of the optical detector includes a circular edge pixel located around a perimeter of the optical detector; and the first sample area includes a circular sampling pixel located on the optical detector such that the circular edge pixel surrounds the circular sampling pixel.

Example 7 includes the system of any of Examples 1-4, wherein: the optical detector includes a rectangular array of pixels with an x-y grid pattern; the first sample area includes a first set of sampling pixels located in a central portion of the optical detector in a first zone, wherein the sampling pixels in the first zone are configured for a corresponding first illumination intensity; a second sample area includes a second set of sampling pixels located on the optical detector in a second zone, such that the second set of sampling pixels surround the first set of sampling pixels, wherein the sampling pixels in the second zone are configured for a second illumination intensity that is less than the first illumination intensity; and the edge region of the optical detector includes a plurality of edge pixels located around a perimeter of the optical detector in a third zone, surrounding the first and second sample areas.

Example 8 includes the system of any of Examples 1-7, wherein the particle sensor unit is implemented without a physical slit.

Example 9 includes the system of any of Examples 1-8, wherein the particle sensor unit is mounted on a vehicle.

Example 10 includes the system of Example 9, wherein the vehicle comprises an aircraft, a spacecraft, a ground vehicle, or a marine craft.

Example 11 includes a particle sensing method, comprising: transmitting a light beam into an interrogation air region; collecting a scattered portion of the light beam from one or more particles in the interrogation air region; and focusing the collected scattered potion of the light beam on an optical detector, wherein the optical detector comprises at least a first sample area that includes one or more sampling pixels, and an edge region that includes one or more edge pixels, wherein the optical detector measures an intensity from the collected scattered portion that corresponds to the one or more particles; combining all intensity data from the one or more sampling pixels; adding the combined intensity data from the one or more sampling pixels to at least a first data set; determining whether to accept overlap intensity data that corresponds to an overlap between one or more of the sampling pixels and one or more of the edge pixels; adding the overlap intensity data to the first data set if accepted; discarding the overlap intensity data if not accepted; and discarding all non-overlapping intensity data from the one or more edge pixels.

Example 12 includes the particle sensing method of Example 11, wherein: the optical detector includes a rectangular array of pixels with an x-y grid pattern; the edge region of the optical detector includes a plurality of edge pixels located around a perimeter of the optical detector; and the first sample area includes a plurality of sampling pixels located on the optical detector such that the edge pixels surround the sampling pixels.

Example 13 includes the particle sensing method of Example 11, wherein: the optical detector includes a concentric ring of pixels; the edge region of the optical detector includes a circular edge pixel located around a perimeter of the optical detector; and the first sample area includes a circular sampling pixel located on the optical detector such that the circular edge pixel surrounds the circular sampling pixel.

Example 14 includes the particle sensing method of Example 11, wherein: the optical detector includes a rectangular array of pixels with an x-y grid pattern; the first sample area includes a first set of sampling pixels located in a central portion of the optical detector in a first zone, wherein the sampling pixels in the first zone are configured for a corresponding first illumination intensity; a second sample area includes a second set of sampling pixels located on the optical detector in a second zone, such that the second set of sampling pixels surround the first set of sampling pixels, wherein the sampling pixels in the second zone are configured for a second illumination intensity that is less than the first illumination intensity; and the edge region of the optical detector includes a plurality of edge pixels located around a perimeter of the optical detector in a third zone, surrounding the first and second sample areas.

Example 15 includes the particle sensing method of Example 14, wherein the method further comprises: analyzing all intensity data from one or more sampling pixels in the first zone, including: combining the intensity data from the one or more sampling pixels in the first zone; and adding the combined intensity data from the first zone to the first data set; analyzing the overlap intensity data from multiple sampling pixels, with one or more of the sampling pixels being in the first zone and one or more of the sampling pixels being in the second zone, including: applying a correction factor to the intensity data from the one or more sampling pixels in the second zone; combining the intensity data from the one or more sampling pixels in the first zone with the corrected intensity data from the one or more sampling pixels in the second zone; and adding the combined intensity data from the first and second zones to the first data set; analyzing all intensity data from one or more sampling pixels in the second zone, including: applying a correction factor to the intensity data from each of the one or more sampling pixels in the second zone; combining the corrected intensity data from each of the one or more sampling pixels in the second zone; and adding the combined corrected intensity data from the second zone to the first data set.

Example 16 includes the particle sensing method of Example 15, wherein the method further comprises: analyzing the overlap intensity data from multiple pixels, with one or more of the pixels being in the second zone, and one or more of the pixels being in the third zone, including: applying a correction factor to the intensity data from the one or more pixels in the second zone; and applying one or more rules for determining acceptance of the overlap intensity data from the one or more pixels in the second and third zones; if the overlap intensity data from the pixels in second and third zones is accepted, then adding the overlap intensity data to the first data set; if the overlap intensity data from the pixels in the second and third zones is not accepted, discarding the overlap intensity data; and discarding all intensity data that is only from the one or more pixels in the third zone.

Example 17 includes the particle sensing method of any of Examples 11-16, wherein the light beam is transmitted by a laser device of a particle sensor unit.

Example 18 includes the particle sensing method of Example 17, wherein the particle sensor unit is implemented without a physical slit.

Example 19 includes the particle sensing method of any of Examples 17-18, wherein the particle sensor unit is mounted on a vehicle.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:
1. A system, comprising:
 a particle sensor unit comprising:
  at least one light source configured to transmit a light beam into an interrogation region;

a set of receive optics configured to collect a scattered portion of the transmitted light beam from one or more particles in the interrogation region; and an optical detector configured to receive the collected scattered portion from the receive optics, the optical detector comprising at least a first sample area, and an edge region, wherein the optical detector is operative to measure an intensity from the collected scattered portion that corresponds to the one or more particles;

wherein the first sample area includes a first set of sampling pixels located in a central portion of the optical detector in a first zone, wherein the sampling pixels in the first zone are configured for a corresponding first illumination intensity;

wherein a second sample area includes a second set of sampling pixels located on the optical detector in a second zone, such that the second set of sampling pixels surround the first set of sampling pixels, wherein the sampling pixels in the second zone are configured for a second illumination intensity that is less than the first illumination intensity; and wherein the edge region includes a plurality of edge pixels located around a perimeter of the optical detector in a third zone, surrounding the first and second sample areas;

a processor unit in operative communication with the particle sensor unit, the processor unit operative to execute instructions to perform a method for analyzing intensity data received from the particle sensor unit, the method comprising:

analyzing intensity data from the sampling pixels in the first zone, including:
combining the intensity data from two or more sampling pixels in the first zone; and
adding the combined intensity data from the first zone to a data set;

analyzing overlap intensity data from multiple sampling pixels, with one or more of the sampling pixels being in the first zone and one or more of the sampling pixels being in the second zone, including:
applying a correction factor to the intensity data from the one or more sampling pixels in the second zone;
combining the intensity data from the one or more sampling pixels in the first zone with the corrected intensity data from the one or more sampling pixels in the second zone; and
adding the combined intensity data from the first and second zones to the data set; and analyzing intensity data from the sampling pixels in the second zone, including:
applying a correction factor to the intensity data from the sampling pixels in the second zone;
combining the corrected intensity data from two or more sampling pixels in the second zone; and
adding the combined corrected intensity data from the second zone to the data set;

analyzing the overlap intensity data from multiple pixels, with one or more of the pixels being in the second zone, and one or more of the pixels being in the third zone, including:
applying a correction factor to the intensity data from the one or more pixels in the second zone; and
applying one or more rules for determining acceptance of the overlap intensity data from the one or more pixels in the second and third zones, including a simple majority rule, where if the particle signal is mostly in the sampling pixels, the particle signal will be kept, and if the particle signal is mostly in the edge pixels, the particle signal will be discarded, wherein;
if the overlap intensity data from the pixels in the second and third zones is accepted, then adding the overlap intensity data to the data set;
if the overlap intensity data from the pixels in the second and third zones is not accepted, then discarding the overlap intensity data;

discarding intensity data that is from the one or more pixels in the third zone;

determining particle distributions in the interrogation region based on the data remaining in the data set; and performing particle differentiation and determining the types of particles in the particle distributions based on the data remaining in the data set.

2. The system of claim 1, wherein the at least one light source comprises a laser device.

3. The system of claim 2, wherein the laser device has an angled configuration with respect to the light collection assembly, such that scattered light from the scattered portion of the transmitted light beam is collected by the light collection assembly.

4. The system of claim 1, wherein:
the optical detector includes a rectangular array of pixels with an x-y grid pattern.

5. The system of claim 1, wherein the particle sensor unit is implemented without a physical slit.

6. The system of claim 1, wherein the particle sensor unit is mounted on a vehicle.

7. The system of claim 6, wherein the vehicle comprises an aircraft, a spacecraft, a ground vehicle, or a marine craft.

* * * * *